United States Patent [19]

Hults

[11] 4,313,727
[45] Feb. 2, 1982

[54] EDUCATIONAL FRAME DEVICE HAVING A ROTATABLE BODY AND ROTATABLE SYMBOL-BEARING INSERTS

[76] Inventor: Johnathan J. Hults, 4022 Ridgedale St., Memphis, Tenn. 38127

[21] Appl. No.: 98,915

[22] Filed: Nov. 30, 1979

Related U.S. Application Data

[63] Continuation-in-part of Ser. No. 951,782, Oct. 16, 1979, abandoned.

[51] Int. Cl.³ .................... G09B 1/22; G09B 19/12; A43C 15/00
[52] U.S. Cl. .................... 434/174; 434/192; 434/198; 434/304; 434/416
[58] Field of Search ............. 434/174, 192, 198, 304, 434/402, 404, 408, 416, 417, 348, 227, 413, 425, 159

[56] References Cited

U.S. PATENT DOCUMENTS

| | | | |
|---|---|---|---|
| 323,350 | 7/1885 | McKenzie | 434/413 |
| 375,095 | 12/1887 | Pollard | 434/174 |
| 665,991 | 1/1901 | Brown | 434/227 |
| 1,432,175 | 10/1922 | Foster | 434/174 |
| 1,877,669 | 9/1932 | Kitze | 434/408 X |
| 2,137,646 | 11/1938 | Dorr et al. | 434/304 |
| 2,871,582 | 2/1959 | Frank | 434/416 |
| 3,230,642 | 1/1966 | Goldscmidt | 434/348 |
| 3,336,682 | 8/1967 | Genin | 434/416 |
| 3,937,930 | 2/1976 | Thomas | 235/78 R |
| 4,026,463 | 5/1977 | Betzler | 235/78 R X |

FOREIGN PATENT DOCUMENTS 570880 12/1975 Switzerland .................... 434/425

*Primary Examiner*—William H. Grieb
*Attorney, Agent, or Firm*—Walker & McKenzie

[57] ABSTRACT

A board-type device for use in teaching children the alphabet, numbes, how to tell time, and the like. The device includes a disk-like, double sided chalkboard member and a ring-like frame member extending completely about the periphery of the blackboard member with the blackboard member rotatably mounted to the frame member. Alphabetic letters and the like are located about the frame member on one side thereof. Numerals and the like may be located about the other side of the frame member with the numerals arranged similar to a clock face. Pointers are attached to both sides of the chalkboard member whereby rotation of the chalkboard member will cause the pointers to point towards various specific letters and/or numbers and/or the like, etc. Indicia-bearing inserts are rotatably attached to the front and back surfaces of the frame.

3 Claims, 10 Drawing Figures

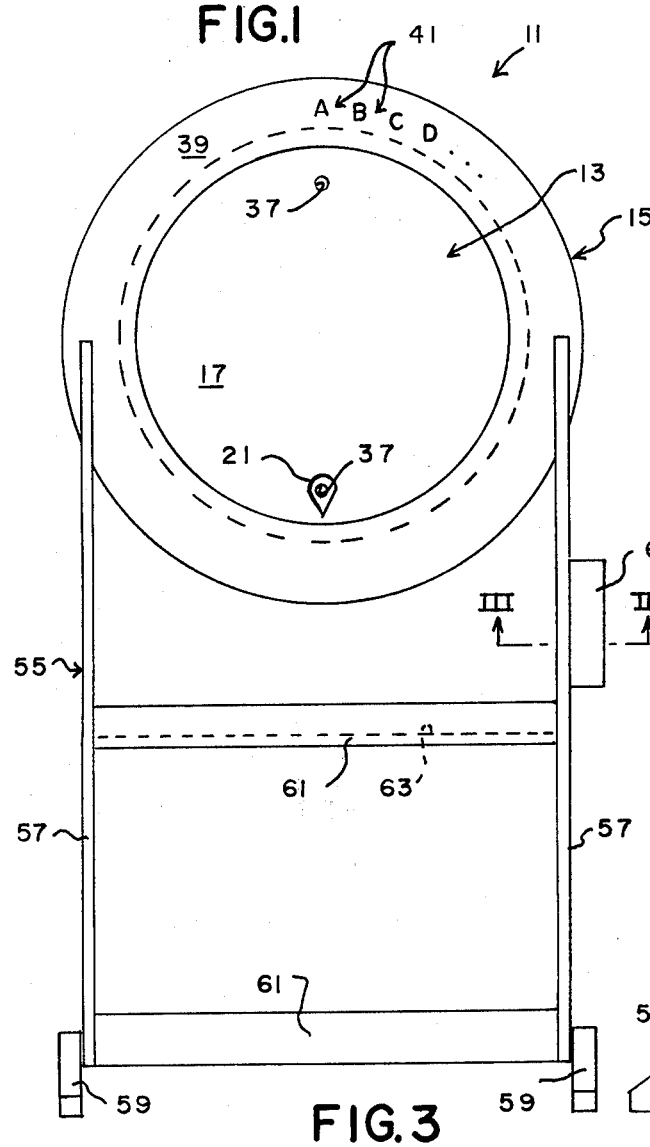
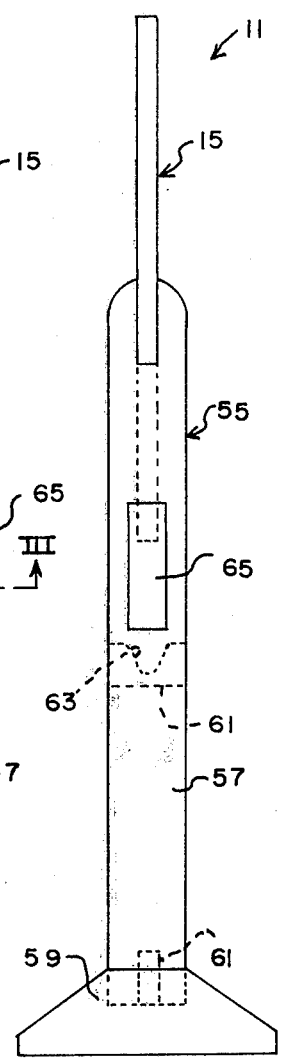
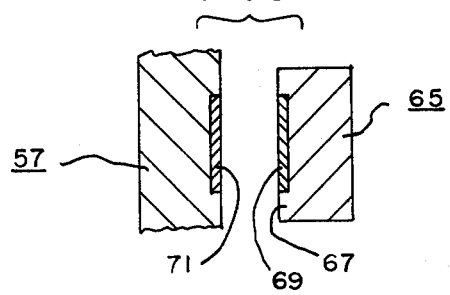

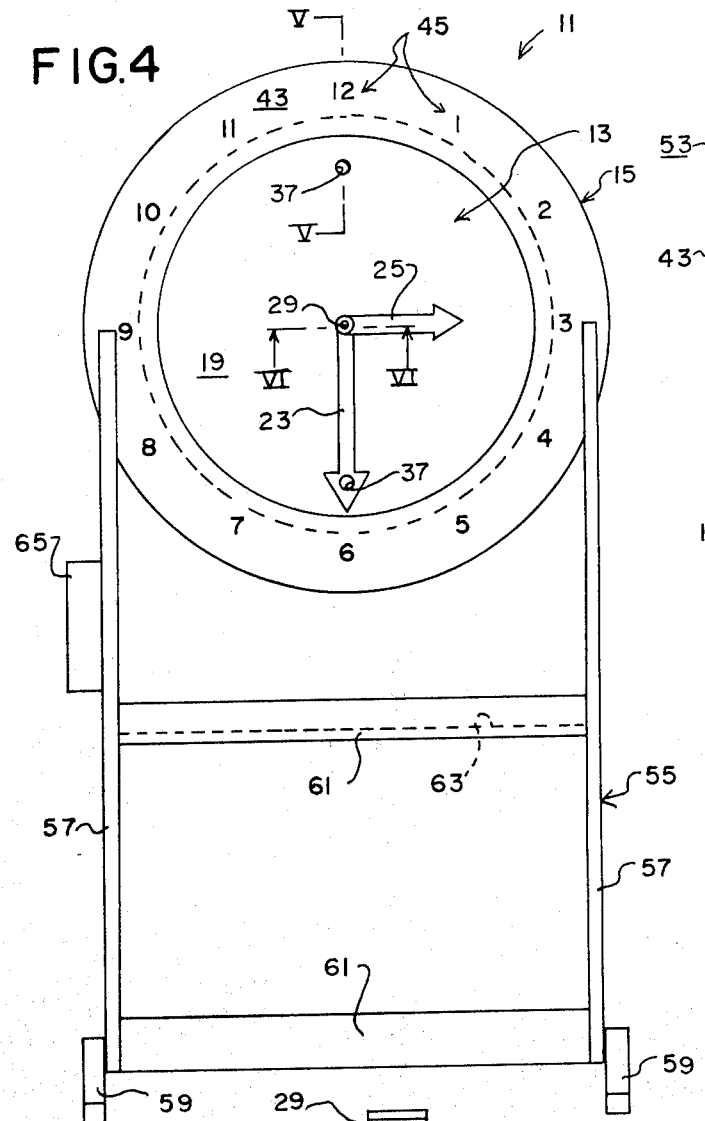
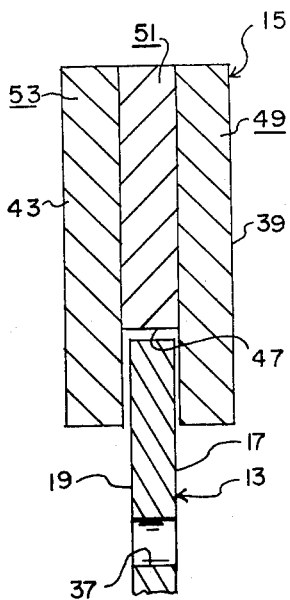

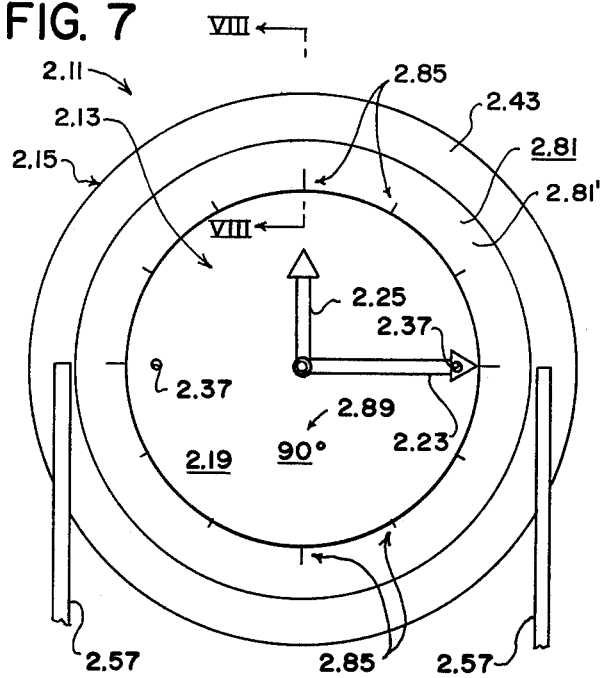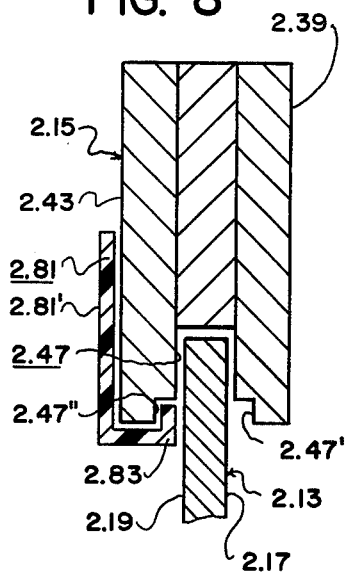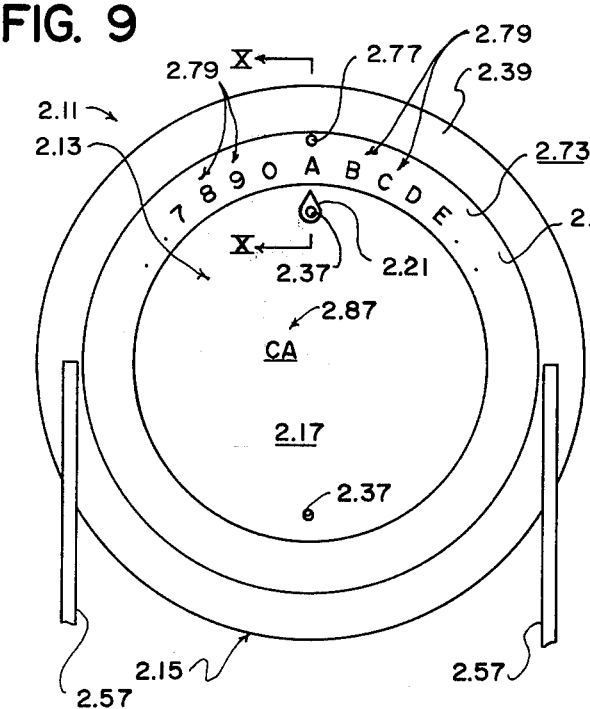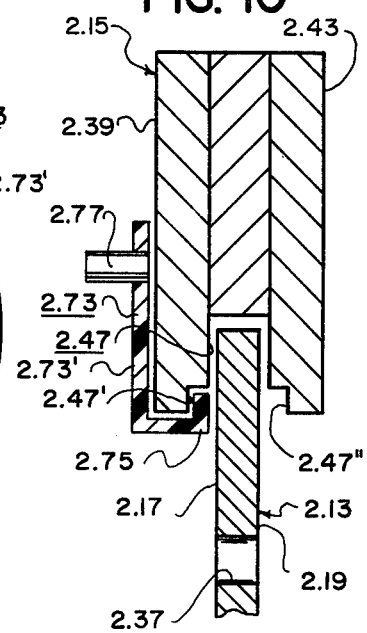

EDUCATIONAL FRAME DEVICE HAVING A ROTATABLE BODY AND ROTATABLE SYMBOL-BEARING INSERTS

CROSS-REFERENCE TO RELATED APPLICATION

This is a continuation-in-part of my application, Ser. No. 951,782, filed Oct. 16, 1979, now abandoned, entitled "Educational Device."

BACKGROUND OF THE INVENTION

1. Field of the Invention:

This invention relates in general to board-type educational devices which allow indicia to be temporarily drawn.

2. Description of the Prior Art:

Chalkboards for allowing numbers, letters and the like to be temporarily written or drawn have long been used for educational purposes. Such chalkboards can either be fixedly attached to a wall or mounted in a movable frame. None of the prior chalkboards or the like disclose or suggest the present invention.

SUMMARY OF THE INVENTION

The present invention is directed towards improving upon prior board-type educational devices which allow indicia to be drawn. The concept of the present invention is to provide such a device with means for allowing the user of the device to selectively point towards various specific symbol indicia means (e.g., letters, numbers, etc.) to aid in various learning processes.

The educational device of the present invention comprises, in general, a body member having a substantially flat face surface, and a frame means for extending around at least a portion of the periphery of the face surface of the body member. The body member has a pointer indicia means (e.g., a painted arrow) attached to the face surface thereof and pointing towards the periphery of the face surface thereof. The frame means has a face surface located substantially adjacent the periphery of the face surface of the body member and has a plurality of spaced apart symbol indicia means (e.g., painted letters, numbers, etc.) attached to the face surface thereof. The body member is rotatable relative to the frame means whereby the body member can be selectively rotated to cause the pointer indicia means thereof to point towards various specific ones of the symbol indicia means of the frame means.

BRIEF DESCRIPTION OF THE DRAWINGS

FIG. 1 is a front elevational view of the educational device of the present invention.

FIG. 2 is a side elevational view thereof.

FIG. 3 is a sectional view as taken on line III—III of FIG. 1 showing the parts in an exploded view.

FIG. 4 is a back elevational view of the educational device of the present invention.

FIG. 5 is an enlarged sectional view as taken on line V—V of FIG. 4.

FIG. 6 is an enlarged sectional view as taken on line VI—VI of FIG. 4.

FIG. 7 is a back elevational view of a portion of a second embodiment of the educational device of the present invention.

FIG. 8 is a sectional view as taken on line VIII—VIII of FIG. 7.

FIG. 9 is a front elevational view of a portion of the second embodiment of the educational device of the present invention.

FIG. 10 is a sectional view as taken on line X—X of FIG. 9.

DESCRIPTION OF THE PREFERRED EMBODIMENTS

A first embodiment of the board-type educational device is shown in FIGS. 1–6 and is identified by the numeral 11. The educational device 11 of the present invention includes a body member 13 and a frame means 15.

The body member 13 has a substantially flat face surface 17 and preferably has a substantially flat back surface 19. The body member 13 is preferably in the shape of a substantially flat, substantially thin disk. The face surface 13 and the back surface 19 preferably includes means for allowing indicia to be written and/or drawn thereon. Preferably, the body member 13 is constructed of fiberboard or the like painted on both sides with chalkboard surfacing material for allowing indicia to be easily written and/or drawn thereon with chalk or the like and with each surface 17, 19 consisting of one side thereof. A pointer indicia means is attached to the face surface 17 in a position so as to point toward the periphery of the face surface 17. More specifically, an arrowhead-like mark 21 may be painted on the face surface 17 as clearly shown in FIG. 1 substantially adjacent and pointing toward the periphery of the face surface 17. Preferably, a pointer indicia means is attached to the back surface 19 and points toward the periphery of the back surface 19. More specifically, a mark 23 similar to the minute hand of a clock may be painted on the back surface 19 as clearly shown in FIG. 4. The minute hand-like mark 23 extends from substantially the center of the back surface 19 to substantially the periphery of the back surface 19 and may terminate at substantially the periphery of the back surface 19 in an arrowhead-like portion. A second pointer indicia means is preferably removably attached to the back surface 19 and points toward the periphery of the member 13 similar to the hour hand of a clock and may be pivotally attached to the back surface 19. The hour hand-like member 23 preferably is pivotally attached to the back surface 19 substantially at the center thereof and extends substantially half way to the periphery thereof as clearly shown in FIG. 4. The hour hand-like mark 25 may be pivotally attached to the back surface 19 in any manner apparent to those skilled in the art which allows the hour hand-like member 25 to pivot relative to the minute hand-like mark 23 and stay in any desired position. For example, a small block of wood 27 or the like may be fixedly attached to the back surface 19 of the body member 13 in any manner apparent to those skilled in the art such as by glue or the like (see FIG. 6). A screw member 29 may be fixedly attached to the block of wood 27 and extends outwardly therefrom as clearly shown in FIG. 6. The hour hand-like member 25 may have an aperture 31 therethrough adjacent the inner end thereof for allowing the hour hand-like member 25 to pass over the screw member 29 as shown in FIG. 6. A nut member 33 may be screwably attached to the screw member 29 over the hour hand-like member 25 to thereby removably attach the hour hand-like member 25 to the back surface 19. A spring 35 may be positioned between the block of wood 27 and the hour hand-like member 25 as shown in FIG. 5 to allow the hour hand-like member 25 to be easily pivoted about the screw member 29 when force is applied thereto and to maintain the hour hand-like member 25 in a set position when no force is applied thereto. The body member 13 preferably includes means substantially spaced from the center thereof for use in manually rotating it. For example, at least one aperture 37 may be provided through the body member 13 substantially adjacent the periphery thereof for reasons which will hereinafter become apparent. Preferably a pair of such apertures 37 spaced substantially 180° apart are provided through the body member 13.

The frame means 15 has a face surface 39 located substantially adjacent the periphery of the face surface 17 of the body member 13. The frame means 15 also has a plurality of spaced apart symbol indicia means attached to the face surface 39 thereof. More specifically, a plurality of letters 41 may be painted on the face surface 39 as clearly shown in FIG. 1. For example, each letter in the English alphabet may be represented on the face surface 39, only a representative number thereof being shown in FIG. 1. The body member 13 is rotatable relative to the frame means 15 whereby the body member 13 can be selectively rotated to cause the arrowhead-like mark 21 to point towards various specific ones of the letters 41. The apertures 37 allow the user of the device 11 to easily manually rotate the body member 13 by inserting a finger, pencil, or the like thereinto. The frame means 15 preferably includes a back surface 43 located substantially adjacent the periphery of the back surface 19 of the body member 13. The frame means 15 also preferably includes a plurality of spaced apart symbol indicia means attached to the back surface 43 thereof. More specifically, a plurality of numerals 45 may be painted on the back surface 43 as clearly shown in FIG. 4. The numerals 45 are preferably arranged about the back surface 43 of the frame means 15 in the same positions and indicate the same numbers as the numerical figures on a clock face. Thus, a specific time is indicated when the body member 13 is rotated until the minute hand-like mark 23 points towards a specific numeral 45 and the hour hand-like member 25 is rotated until it points towards a specific numeral 45. The frame means 15 is preferably in the shape of a ring and extends completely around the periphery of the body member 13. The frame means 15 preferably has an annular groove 47 therein for trappingly receiving the periphery of body member 13 and functioning as a bearing race (see FIG. 5). Preferably, the frame means 15 consists of a first ring member 49, a second ring member 51, and a third ring member 53 attached to one another in any manner apparent to those skilled in the art such as by glue or the like with the outer surface of the first member 49 forming the face surface 39 of the frame means 15 and with the outer surface of the third ring member 53 forming the back surface 43 of the frame means 15. The second ring member 51 has a larger inside diameter than the first and second ring member 49, 53 whereby the groove 47 is formed when the ring members 49, 41, 53 are attached to one another as shown in FIG. 5. It should be noted that roller bearings or the like (not shown) may be provided between the outer edge of the body member 13 and the groove 47 to allow the body member 13 to rotate easily relative to the frame means 15.

The frame means 15 may also include a stand 55 for supporting the body member 13 above a supporting surface. The stand 55 may be constructed in any manner apparent to those skilled in the art. For example, the stand may include a pair of leg members 57 fixedly attached to the ring members 49, 53 and depending downwardly therefrom, a pair of foot members 59 attached to the bottom end of the leg members 57 for resting upon a supporting surface and a pair of cross members 61 extending from one leg member 57 to the other leg member 57. The upper cross member 61 may have a groove 63 in the upper surface thereof for acting as a chalk tray and the like. The stand 55 may be made adjustable in any manner apparent to those skilled in the art to allow the height of the body member 13 above the supporting surface to be varied. Also, a seat (not shown) may be mounted on the stand 55 to allow the user of the device 11 to sit thereon while using the device 11.

The device 11 may include an eraser means 65 for selectively erasing any indicia written and/or drawn temporarily on the face surface 17 or back surface 19. The eraser means 65 has a back side 67 and may include a magnet member 69 embedded in the back side 67 (see FIG. 3). At least a portion of the frame means 15 may be of a magnetically attractable material whereby the eraser means 65 can be selectively attached to the frame means 15. For example, a piece of iron 71 may be embedded in one of the leg members 57 (see FIG. 3).

The device 11 may be used in various manners which should now be apparent to those skilled in the art. For example, the face surface 17 and back surface 19 may be utilized in the same manner as a typical blackboard or chalkboard to write and/or draw indicia thereon. Additionally, the arrowhead-like mark 21 may be utilized to point out various specific letters 41 or the like whereupon a child can be asked to duplicate the specific letter on the face surface 17, and vice versa, thereby teaching the child letters, spelling, writing and the like. Further, the minute hand-like mark 23 may be pointed to various specific numbers 45 and the child asked to duplicate the specific number 45 on the back surface 19, and vice versa, thereby teaching the child numbers and the like. Further, the hour hand-like member 25 may be utilized in conjunction with the minute hand-like mark 23 in various manners to teach a child how to tell time. Various other manners of utilizing the device 11 should now be apparent to those skilled in the art.

A second embodiment of the board-type educational device is shown in FIGS. 7-10 and is identified by the numeral 2.11. The educational device 2.11 includes a body number 2.13 and a frame member 2.15.

The body member 2.13 is substantially identical to the corresponding components of the body member 13 of the educational device 11 and the above description of the educational device 11 should be referred to for a more complete description.

The frame member 2.15 is substantially identical to the frame member 15 of the educational device 11 and includes a ring member having a face surface 2.39, a back surface 2.43, and an annular groove 2.47 for trappingly receiving the body member 2.13 (see FIGS. 8 and 10). The frame member 2.15 preferably includes a stand for supporting the body member 2.13 above a supporting surface. The stand may include leg members 2.57 fixedly attached to the ring member and depending downwardly therefrom. The various components of the frame member 2.15 are substantially identical to the corresponding components of the frame member 15 of the educational device 11 and the above description of the educational device 11 should be referred to for a more complete description. However, the groove 2.47 of the frame member 2.15 has a first offset portion 2.47' and a second offset portion 2.47".

The educational device 2.11 includes a first insert means 2.73 for being selectively positioned on the face surface 2.39 of the ring member of the frame member 2.15 (see FIGS. 9 and 10). The first insert means 2.73 includes a hook-like portion 2.75 for being removably snapped into the first offset portion 2.47' of the groove 2.47 (see FIG. 10) whereby the first insert means 2.73 is attached to the frame member 2.15 in such a manner that allows it to be rotated about the ring member of the frame member 2.15. The first insert means 2.73 may include a handle means 2.77 for use in rotating it about the ring member of the frame member 2.15. The first insert means 2.73 is preferably substantially opaque and preferably substantially covers any indicia or the like on the face surface 2.39 of the ring member of the frame member 2.15. A plurality of spaced-apart symbol indicia means 2.79 is attached to the face surface 2.73' of the first insert means 2.73 (see FIG. 9). More specifically, each letter of the English alphabet and each character of the Arabic numeral system is preferably painted on the face surface 2.73' of the first insert means 2.73.

The educational device 2.11 may include a second insert means 2.81 for being selectively positioned on the back surface 2.43 of the ring member of the frame member 2.15 (see FIGS. 7 and 8). The second insert means 2.81 includes a hook-like portion 2.83 for being removably snapped into the second offset portion 2.47" of the groove 2.47 (see FIG. 8) whereby the second insert means 2.81 is attached to the frame member 2.15. The second insert means 2.81 is preferably substantially opaque and preferably substantially covers any indicia or the like on the back surface 2.43 of the ring member of the frame member 2.15. A plurality of spaced-apart symbol indicia means 2.85 is attached to the face surface 2.81' of the second insert means 2.81 (see FIG. 7). More specifically, the face surface 2.81' of the second insert means 2.81 is preferably divided into degrees and various degree indicia is painted on the face surface 2.81' of the second insert means 2.81.

The device 2.11 may be used in various manners which should now be apparent to those skilled in the art. For example, with the first and second insert means 2.73, 2.81 removed, the device 2.11 may be used in the same manner as heretofore described relative to the device 11. With the first insert means 2.73 attached to the frame member 2.15 as shown in FIGS. 9 and 10, the device 2.11 may be advantageously used for the teaching of spelling, number combinations, and the like. That is, an instructor may ask a student to point out the letters of and write a certain work such as, for example, "cat." The student can then first rotate the first insert means 2.73 until the letter "C" thereon is aligned with the mark 2.21, then write or draw the letter "C" on the face surface 2.17 of the body member 2.13 as indicated at 2.87 on FIG. 9, then rotate the first insert means 2.73 until the letter "A" thereon is aligned with the mark 2.21, then write or draw the letter "A" on the face surface 2.17 of the body member 2.13 adjacent the letter "C" as indicated at 2.87 on FIG. 9, etc. The student can be instructed to point out the individual numbers of and write a certain number combination in a like manner. With the second insert means 2.81 attached to the frame member 2.15 as shown in FIGS. 7 and 8, the device 2.11 may be advantageously used for the teaching of angular relationships and the like. That is, an instructor may ask a student to point out and write a certain angular relation such as, for example, "90°." The student can then move the mark 2.25 until the spacing between the marks 2.23, 2.25 represent "90°" as indicated by the indicia means 2.85 on the insert means 2.81, and can then write or draw "90° on the back surface 2.19 of the body member 2.13 as indicated at 2.89 on FIG. 7.

Although the invention has been described and illustrated with respect to a preferred embodiment thereof, it is not to be so limited since changes and modifications may be made therein which are within the full intended scope of the invention.

I claim:

1. A board-type educational device comprising: a body member having a substantially flat face surface, and a frame means for extending around at least a portion of the periphery of said face surface of said body member; said body member having a pointer indicia means attached to said face surface thereof, said pointer indicia means pointing towards the periphery of said face surface of said body member, said frame means having a face surface located substantially adjacent the periphery of said face surface of said body member and having a plurality of spaced apart symbol indicia means attached to said face surface thereof, said pointer indicia means and said symbol indicia means being rotatable relative to one another whereby said pointer indicia means can be selectively caused to point towards various specific ones of said symbol indicia means of said frame means, said face surface of said body member including means for allowing indicia to be drawn thereon, said body member being in the shape of a substantially flat, substantially thin disk, said frame means being in the shape of a ring and extending completely around the periphery of said body member and including insert means for being rotatably attached to said face surface of said frame means, said symbol indicia means being attached to said insert means for rotation therewith.

2. The educational device of claim 1 in which said insert means includes a hook portion for rotatably engaging a portion of said frame means.

3. The educational device of claim 1, further including a second insert means rotatably attached to said back surface of said frame means, and a plurality of spaced apart symbol indicia means being attached to said second insert means.

* * * * *